Patented Nov. 6, 1928.

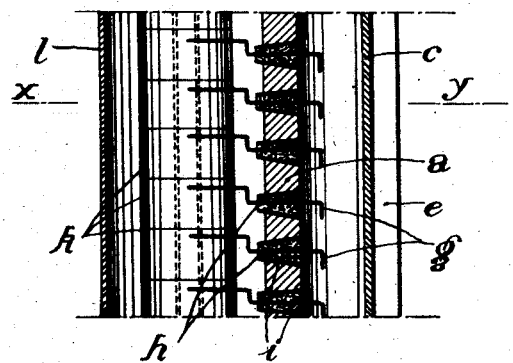
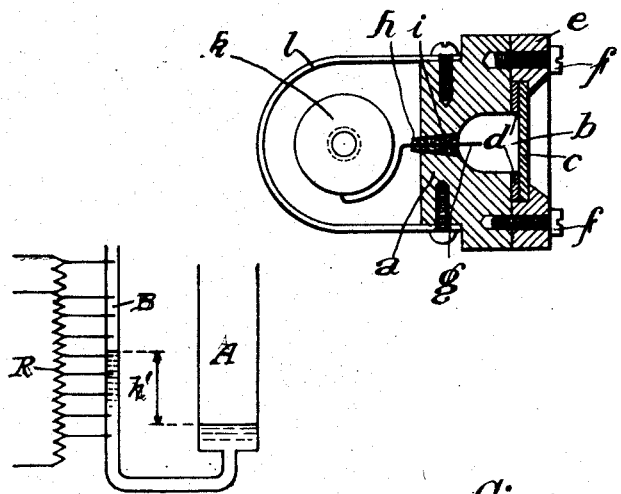

1,690,949

UNITED STATES PATENT OFFICE.

GIUSEPPE SACCO ALBANÈSE, OF PARIS, FRANCE.

APPARATUS FOR MEASURING THE RATE OF FLOW OF FLUIDS.

Application filed June 7, 1924, Serial No. 718,580, and in France June 9, 1923.

The present invention relates to a liquid measuring device, and has for an object to indicate at a distance from the liquid variations in the surface level of the same.

Another object of the invention is to so dispose resistances at successive points relative to a column of liquid as to bring into and remove the resistances from an electric circuit as the surface level of the column of liquid fluctuates so that there is a corresponding fluctuation in the circuit.

The invention also embodies a novel and simple construction of device for supporting a column of mercury or other suitable liquid which may vary in height, and for supporting in a novel and simple manner a number of resistances at spaced heights relative to the column.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a fragmentary vertical section taken through a portion of a measuring device constructed according to the present invention, Figure 2 is a transverse section through the same taken substantially on the line X—Y of Figure 1, and Figure 3 is a diagrammatic view of the device showing the relation of the parts and the liquid supporting means.

Referring to the drawing, and first to Figure 3, A designates one branch of relatively large diameter of a tube for mercury or other suitable liquid, and B designates a relatively small diameter branch of the tube wherein the fluctuations in the liquid level may be more readily measured. The distance $h'$ may indicate by difference in surface levels in the branches A and B of the tube differences in pressures on the surfaces of the liquid columns in the two branches. R is a resistance in an electric circuit which is divided into sections by contact points entering at different heights into the branch B for contact with the liquid to close the circuit variably through the resistances.

Referring now to Figures 1 and 2, $a$ designates a block of metal or the like having a longitudinal groove $b$ in one side providing the small diameter branch of the tube and in which the liquid is adapted to rise and fall. The open side of the groove $b$ is closed by a thick panel $c$ of glass sealed against the block $a$ by packing strips $d$. A lid or frame $e$ is secured to the block $a$ around the panel $c$ by screws $f$, and overlies the marginal edge portion of the panel $c$ to hold it in place.

The block $a$ is provided with a series of holes or openings $i$ of conical form which open at their larger ends into the groove $b$ and at their smaller ends through the opposite side of the block $a$. Studs $g$ are centered and sealed in these openings $i$ by plugs $h$ of insulating material which is placed in the openings in any suitable manner. The studs $g$ provide contact points extending from resistance coils $k$ arranged along the side of the block $a$ and protected by a cover $l$ which may be supported on the block $a$.

In operation, as the liquid rises in the groove $b$ it comes into contact with the studs $g$ and changes the resistance in the circuit to which the coils $k$ are connected as shown in Figure 3. Thus fluctuations in the column of liquid cause corresponding changes or fluctuations in the circuit, and the latter may include any suitable registering or indicating device desired and which may be located adjacent to or at a distance from the coils $k$.

I claim:

1. A tubular rheostat comprising a block having a groove therein adapted to receive a body of mercury and provided with holes leading through the block at spaced points along the inner wall of the groove, a plate secured against the block for closing said groove, contact studs carried by the block in said holes and projecting at one end into the groove for contact with the mercury, packings carried by the block in said holes about said studs for sealing the same in the block, and resistance coils connected to said contact studs.

2. A tubular rheostat comprising a block having a longitudinal groove therein adapted to receive a body of mercury and also having holes extending through the block in spaced relation and opening into the groove, a plate secured against the block for closing the groove, said holes in the block tapering outwardly from the groove, contact studs carried by the block in said holes and exposed at one end to the mercury in the groove, conical packings carried by the block in said holes for sealing the studs in the block, and resistance coils connected to said contact studs.

GIUSEPPE SACCO ALBANÈSE.